United States Patent [19]

Birt et al.

[11] 4,288,481
[45] Sep. 8, 1981

[54] FOIL VIDEO DISCS

[75] Inventors: David E. Birt, London; Peter J. Clarke, South Ruislip, both of England

[73] Assignee: EMI Limited, Hayes, England

[21] Appl. No.: 168,643

[22] Filed: Jul. 11, 1980

[30] Foreign Application Priority Data

Jul. 14, 1979 [GB] United Kingdom ............... 24622/79

[51] Int. Cl.³ ............................................. B29C 3/00
[52] U.S. Cl. ...................................... 428/64; 264/107
[58] Field of Search .......................... 264/107; 428/64

[56] References Cited

U.S. PATENT DOCUMENTS 3,945,790  3/1976  Puech ............................. 264/107 X
4,032,610  6/1977  Spiller ................................. 264/107
4,231,730  11/1980  Birt ................................. 425/810 X

FOREIGN PATENT DOCUMENTS 1437175  5/1976  United Kingdom .

Primary Examiner—Thomas P. Pavelko
Attorney, Agent, or Firm—Fleit & Jacobson

[57] ABSTRACT

A two stage moulding procedure for the production of foil video discs. In a first pressing operation a satin finish consisting of a surface irregularity is applied to a surface of the foil, and then, in a second pressing operation, the foil is pressed between stamper plates to impart thereto, at one or both surfaces an impression of the information or data to be recorded. The satin finish may be formed by pressing the foil between stamper plates bearing the satin finish at their inwardly facing surfaces or alternatively between a pair of rollers bearing the satin finish at their surfaces.

11 Claims, 2 Drawing Figures

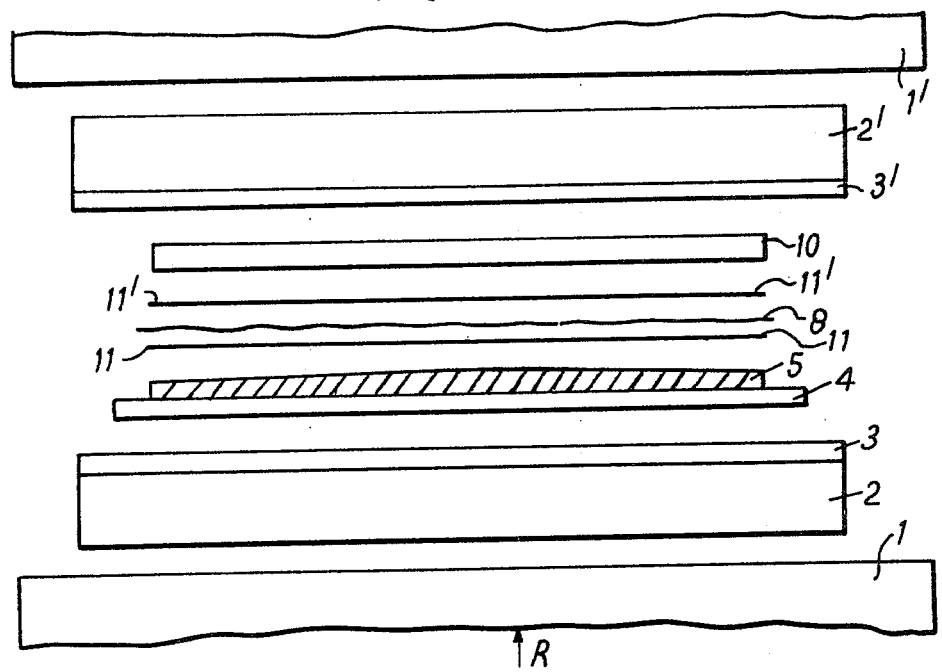
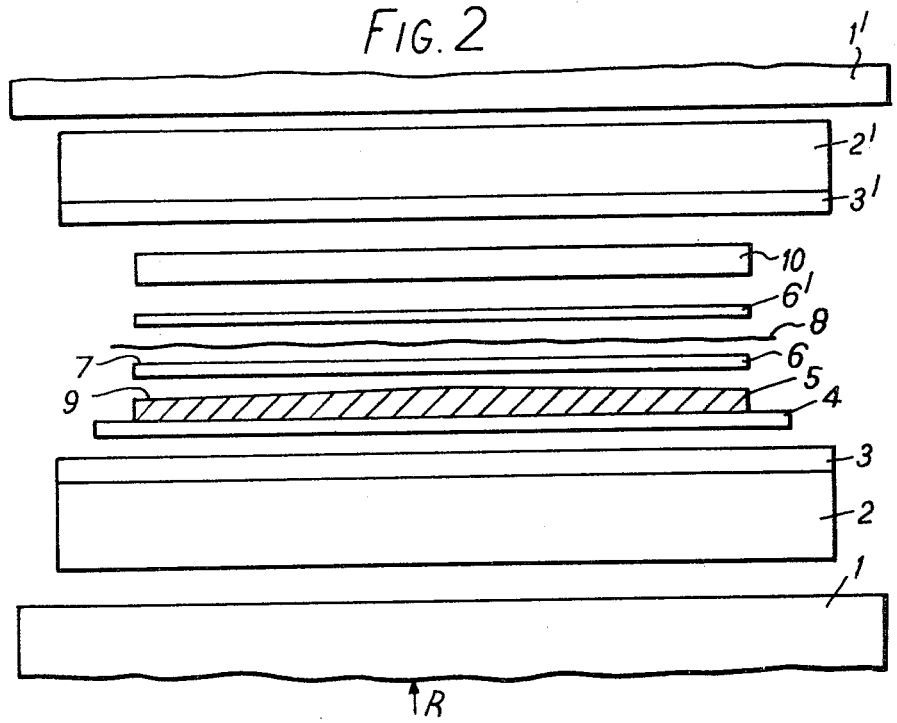

FOIL VIDEO DISCS

This invention relates to the moulding of thermoplastics video discs.

Video discs can in principle be formed by moulding a thin sheet of a thermoplastics material using a heated stamper or matrix, which at its surface bears a microrelief structure representing the data or information to be recorded. This structure is usually comprised of a series of holes or pits each no more than a few microns across and typically no more than one micron deep. Due to the microscopic scale of the data the techniques which are adopted to form an impression of the relief structure in a thermoplastics foil prove to be far more exacting than the techniques hitherto used in the production of audio disc records.

In particular it is preferable that the moulded video disc should exhibit no short wavelength (i.e. of the order of one micron) irregularities in general flatness, and so it is important that during moulding the stamper and foil should be maintained in close parallelism. Furthermore any pockets of air which may be trapped between the stamper and foil should be preferably expelled or permitted to escape during moulding—such pockets of trapped air can result in the formation of blank regions in a moulded disc which can extend for tens or hundreds of microns. Similarly any surface imperfections in the foil itself, calendering marks for example, which can often be more than a micron deep, should preferably be removed.

The moulding arrangement described in our copending UK Patent Application No. 46071/78 provides a means whereby video discs may be successfully moulded. The arrangement described therein comprises a resilient rubber compensator, shaped to have a convex profile, which is placed between one or both pairs of a press mould block and an adjacent stamper. Such a compensator serves to offset any inherent lack of parallelism in the press and also to assist in forcing trapped air outwards from the centre of the foil during moulding. Using this arrangement a loading force of approximately $100 \times 10^3$ KG is used and the degree of convexivity of the compensator is limited so that the tendency for the foil to stretch during moulding is minimised. Stretching of the foil is undesirable since this adversely affects its properties during use. For example, in a system of air supported rotation, the flight (i.e. the aerodynamic stability) of the disc during rotation may be impaired.

It is an object of the present invention to provide an improved method for moulding video discs.

According to one aspect of the invention there is provided a method of moulding a thermoplastics foil to form a video disc comprising the steps of:

(a) providing means for impressing a thermoplastics foil with a satin finish consisting of a surface irregularity of C.L.A. depth between 250 nm and 1000 nm and in a first pressing operation impressing a surface of the foil with the satin finish, (b) providing a pressing arrangement for use in a second pressing operation, the arrangement comprising a pair of substantially parallel mould blocks, means for applying pressure to the mould blocks, a pair of substantially parallel stamper plates mounted between the mould blocks, at least one of the stamper plates bearing at its surface a relief structure indicative of information or data to be impressed and between an adjacent mould block and stamper plate a resilient material compensator comprising a body of a resilient material having a convex surface and in said second pressing operation pressing the foil between the opposed stamper plates to impart to said surface thereof having the satin finish an impression of the micro relief structure.

The means for impressing the foil with the satin finish may be a further pressing arrangement comprising a pair of substantially parallel mould blocks, means for applying pressure to the mould blocks, and a pair of substantially parallel stamper plates mounted between the mould blocks, at least one of the stamper plates bearing the satin finish at its inwardly facing surface.

The means for impressing the foil with the satin finish may alternatively be a pair of substantially parallel rollers which have a satin finish and through which the foil is passed.

According to another aspect of the invention there is provided a video disc whenever manufactured by any of the methods described above. In order that the invention may be more readily understood a specific example will be described by reference to the accompanying drawings of which, FIGS. 1 and 2 respectively represent arrangements used in the first and second pressing stages in the moulding of a plastics video disc.

The arrangement which is used to impress the thermoplastics foil with the microrelief structure representing the data to be recorded is of the type described in our copending British Patent Application No. 46071/78. The important features of this arrangement are illustrated schematically in FIG. 2 of this specification.

Referring to FIG. 2, a pair of mould blocks, 2 and 2', typically of steel, are mounted between the top and bottom blocks, 1' and 1, of an hydraulic press capable of delivering a maximum loading force of $450 \times 10^3$ kG. Each mould block has a cover plate, 3 and 3', which is accurately machined to provided a uniform and parallel pair, and the blocks are heated and cooled by means of a five start spiral arrangement, of the type described in our UK Pat. No. 1,437,175, which is capable of providing a uniformly heated moulding area approximately 35 cms in diameter. Steam is used to heat the mould blocks (to a temperature of about 125°–130° C.) and is supplied by means of a steam accumulator which is fed by means of a Stone Platt flash boiler, not shown in the drawing. To cool the mould blocks water is circulated at a pressure of approximately 150 psi by means of a water pump.

Polished stampers, 6 and 6', which are typically made of nickel, are positioned between the mould blocks and a thermoplastic foil, 8, which is to be moulded is placed between the stampers. At least one of the stampers has at its inwardly facing surface, 7, micro relief structure which represents the information or data to be recorded in the foil. As explained in BP application No. 46071/78 the foil is typically made of polyvinylchloride (PVC) or of a copolymer of PVC with polyvinyl acetate PVCA, typically 150 microns thick, although a MYLAR (RTM) foil typically 150 microns thick, having a PVC coating 1 to 2 microns thick can be used.

Great care is, of course, taken to machine and set the elements comprising the pressing arrangement, in order to achieve close parallelism between the stamper and foil during the moulding operation, but it is inevitable that this cannot be perfectly accomplished.

In order to offset an inherent lack of parallelism in the press a resilient material compensator is placed between a mould block and a stamper, and such a compensator is shown at 5, in FIG. 2, and is mounted on a backing plate, 4. A compensator of this type is described fully in BP Application No. 46071/78, and is typically made of a rubber (silicon rubber, for example) having a hardness of 74° (IRHD) or alternatively a hardness in the range 60° to 75° (IRHD). The compensator is ground to have a substantially convex surface, 9, which during moulding offsets a lack of parallelism between the elements which form the arrangement, and also tends to expel pockets of air which may be trapped between the foil and the stamper. The compensator is loaded with between 60% and 75% of a thermally conductive material, such as carbon black or a metallic powder which tends to reduce the pressing time.

Since in the one stage pressing operation relatively high loading forces (typically $100 \times 10^3$ kG) are applied in order to accomplish a successful moulding, the degree of convexity is limited in order to minimise stretching of the foil during pressing. Typically for a foil disc 34 cms in diameter the depth of the convex surface lies between 0.1 mm and 1.0 mm, and in a typical example is about 0.4 mm. In general the ratio of the diameter of the compensator to its depth should lie between 340 and 3400.

It has now been found that by adopting a two stage moulding procedure it is possible to successfully produce video discs using a loading force which is considerably lower than that hitherto used in the single stage moulding procedure. Loading forces as low as $15 \times 10^3$ kG may typically be used.

In a preferred procedure the pressing arrangement, illustrated in FIG. 1, is used in a first pressing stage. This arrangement differs from that of FIG. 2 in that the nickel stampers, 6 and 6', are replaced by plates, 11 and 11'. which are typically made of stainless steel (¼ to ½ mm thick), and have a satin finish applied at their inwardly facing surfaces.

To produce the satin finish the plates are caused, by an etching or brushing technique, to have a surface irregularity which in this example is about 750 nm deep measured as a Centre Line Average (C.L.A.) using a Talysurf. Alternatively a satin finish 250 nm to 1000 nm C.L.A. deep could be used.

During the first pressing stage the plates, 11 and 11', act to impart a satin finish to the surface of the foil, and also significantly reduce the depth of surface imperfections (e.g. calendering marks) typically to a depth of less than 1 micron.

Then, during the second pressing stage, the treated foil is remoulded between the nickel stampers, 6 and 6', so that an impression of the relief structure, which constitutes the video information, is formed at its surface.

The formation of the satin finish during the first pressing stage provides a network of fine channels (typically between 250 nm and 1000 nm C.L.A. deep) at the surface of the foil. The provision of these channels serves to assist in the removal of air trapped between the stampers and foil during the second stage of moulding and therefore permits the much lower loading forces, of around $15 \times 10^3$ kG, to be used. It will of course be appreciated, however, that the channels which comprise the satin finish have such a small depth that they do not interfere with the pressing of the video information.

In another procedure the first pressing stage can be achieved using a pair of nip rollers, which also have a satin finish and between which the foil is passed for moulding.

Since the two stage pressing procedure, described above, permits the use of smaller loading forces the tendency for the foil to stretch during pressing is reduced, and as described above, this helps to improve the flight of the disc during rotation.

It will be appreciated that the resilient material compensator, 5, may be included between both pairs of a mould block and an adjacent stamper. Alternatively, however, and particularly when the foil is to be impressed on one side only, a compensator is provided only between the pair adjacent to the impressed side of foil, and a flexible material member, 10, having a high resistance to stretch (a custom felt, for example) is provided between the other pair. Such an assymetrical arrangement is shown in FIGS. 1 and 2.

The use of the two stage pressing procedure of this invention provides certain advantages over the single stage pressing procedure, and in particular permits the use of smaller loading forces during moulding which reduces the tendency for the foil to stretch.

What we claim is:

1. A method of moulding a thermoplastics foil to form a video disc comprising the steps of:
    (a) providing means for impressing a thermoplastics foil with a satin finish consisting of a surface irregularity of C.L.A. depth between 250 nm and 1000 nm and in a first pressing operation impressing a surface of the foil with the satin finish,
    (b) providing a pressing arrangement for use in a second pressing operation, the arrangement comprising a pair of substantially parallel mould blocks, means for applying pressure to the mould blocks, a pair of substantially parallel stamper plates mounted between the mould blocks, at least one of the stamper plates bearing at its surface a relief structure indicative of information or data to be impressed and between an adjacent mould block and stamper plate a resilient material compensator comprising a body of a resilient material having a convex surface and in said second pressing operation pressing the foil between the opposed stamper plates to impart to said surface thereof having the satin finish an impression of the micro relief structure.

2. A method according to claim 1 wherein the ratio of the diameter of said convex surface to the depth thereof is no less than 340 and no greater than 3400.

3. A method according to claims 1 or 2 wherein the means for impressing the foil with the satin finish is a further pressing arrangement comprising a pair of substantially parallel mould blocks, means for applying pressure to the mould blocks, and a pair of substantially parallel stamper plates mounted between the mould blocks, at least one of the stamper plates bearing the satin finish at its inwardly facing surface.

4. A method according to claim 3 wherein the means for impressing the foil with the satin finish includes a further resilient material compensator between an adjacent mould block and stamper plate, said further compensator comprising a body of a resilient material having a convex surface, the ratio of the diameter of the surface to the depth thereof being no less than 340 and no greater than 3400.

5. A method according to claims 1 or 2 wherein the means for impressing the foil with the satin finish is a pair of substantially parallel rollers which have a satin finish and through which the foil is passed.

6. A method according to claims 1 or 2 wherein said resilient material is rubber having an IRHD hardness in the range 60° to 75°.

7. A method according to claim 6 wherein the rubber has an IRHD hardness in the range of 73° to 75°.

8. A method according to claims 1 or 2 wherein the resilient material is loaded with between 60% and 75% by weight of a thermally conductive material.

9. A method according to claim 8 wherein the thermally conductive material is carbon black or a metallic powder.

10. A method according to claims 1 to 2 wherein the depth of the convex surface of a compensator lies between 0.1 mm and 1.0 mm.

11. A video disc formed by a method according to claim 1.

* * * * *